United States Patent [19]
Zhao et al.

[11] Patent Number: 6,064,067
[45] Date of Patent: May 16, 2000

[54] HIGH-GAIN INFRARED COLLECTOR AND DATA NODE

[75] Inventors: Yang Zhao, Novi; Dan Hu, Detroit, both of Mich.

[73] Assignee: Wayne State University, Detroit, Mich.

[21] Appl. No.: 09/059,732

[22] Filed: Apr. 13, 1998

[51] Int. Cl.[7] .................................................. G01N 21/62
[52] U.S. Cl. ................... 250/353; 250/342; 250/227.28; 359/173; 359/172; 359/159
[58] Field of Search ..................... 250/353, 342, 250/227.28; 359/173, 172, 159

[56] References Cited

U.S. PATENT DOCUMENTS

| | | | |
|---|---|---|---|
| 4,321,594 | 3/1982 | Galvin et al. | 340/567 |
| 4,707,605 | 11/1987 | Astheimer et al. | 250/353 |
| 4,868,391 | 9/1989 | Messiou | 250/353 |
| 5,095,211 | 3/1992 | Kimata | 250/370 |
| 5,103,108 | 4/1992 | Crimmins | 250/338 |
| 5,136,164 | 8/1992 | Hendrick, Jr. | 250/353 |
| 5,138,164 | 8/1992 | Koh | 250/339 |
| 5,239,179 | 8/1993 | Baker | 250/353 |
| 5,313,060 | 5/1994 | Gast et al. | 250/221 |
| 5,313,542 | 5/1994 | Castonguay | 250/227.28 |
| 5,345,327 | 9/1994 | Savicki | 359/172 |
| 5,359,189 | 10/1994 | Savicki | 250/216 |
| 5,393,978 | 2/1995 | Schwarz | 250/353 |
| 5,401,968 | 3/1995 | Cox | 250/353 |
| 5,541,414 | 7/1996 | Hori | 250/349 |
| 5,567,942 | 10/1996 | Lee et al. | 250/353 |
| 5,602,668 | 2/1997 | Kuchta | 359/173 |

OTHER PUBLICATIONS

"Compound Parabolic Concentrators for Narrowband Wireless Infrared Receivers," by Ho and Kahn; *Optical Engineering*, May 1995; vol. 34, No. 5; pp1385–1395.

*Primary Examiner*—Constantine Hannaher
*Assistant Examiner*—Andrew Israel
*Attorney, Agent, or Firm*—Rohm & Monsanto, PLC

[57] ABSTRACT

An infrared collector employs a concentrator formed of a plurality of spatially related gradient-indexed (GRIN) lenses and a photodetector, interconnected by optical fibers. Since the GRIN lenses are arranged on a hemispherical shell, the concentrator is relatively insensitive to the direction of the incoming infrared radiation. Optical fibers are used to connect the GRIN lenses to a photodetector, whereby assembly is simplified. The infrared detector in the collector of the present invention has a size that is significantly smaller than those used in conventional collectors. The concentrator has high optical gain, and therefore, is particularly well adapted for use in low-power portable systems. The arrangement is useful as a node in an infrared data network.

18 Claims, 2 Drawing Sheets

HIGH-GAIN INFRARED COLLECTOR AND DATA NODE

BACKGROUND OF THE INVENTION

1. Field of the Invention

This invention relates generally to systems for receiving electromagnetic radiation, and more particularly, to an arrangement that is particularly suited to collect infrared electromagnetic radiation, particularly for determining the information content thereof.

2. Description of the Related Art

Conventional infrared detector arrangements suffer from multiple deficiencies, including insensitivity and small field of view. Oftentimes, the structure that is added to a photosensor to increase its field of view results in a decrease in sensitivity, particularly to light from a point source. Conversely, an increase in sensitivity is achieved at the expense of field of view. There is a need, therefore, for a detector arrangement that can achieve high sensitivity over a large aperture angle.

Sensitivity is achieved by effecting a more efficient collection of the ambient light, whereby a greater portion of the ambient light that impinges upon the infrared detector arrangement is delivered to the light-sensitive surface of a photodetector. In this regard, it is desired to reduce reflection of the ambient light.

Gradient-index (GRIN) lenses are known to achieve efficient collection of the ambient light in the infrared to visible range of optical frequencies. Such known arrangements, however, have a limited field of view and a limited effective light collection region. Thus, these limitations of GRIN lenses limit their utility per se as adequate data network nodes.

It is, therefore, an object of this invention to provide an inexpensive arrangement for receiving electromagnetic information signals propagated through air from a variety of directions.

It is another object of this invention to provide an inexpensive arrangement that efficiently receives and detects ambient light.

It is also an object of this invention to provide an apparatus that is useful as a data network node, particularly one that is operated in the infrared region of the electromagnetic spectrum.

SUMMARY OF THE INVENTION

The foregoing and other objects are achieved by this invention which provides, in a first apparatus aspect thereof, an arrangement for collecting electromagnetic radiation. In accordance with the invention, a plurality of lens elements are provided, each having a lens input for receiving a portion of the electromagnetic radiation and a lens output for producing an electromagnetic signal responsive to the received portion of the electromagnetic radiation. A detector having a detector input for receiving an input electromagnetic signal, and a detector output for producing an electrical signal responsive to the input electromagnetic signal is coupled each of the lens elements by an electromagnetic conduit that couples the lens output of each of the lens elements to the detector input.

In a preferred embodiment, each of the plurality of lens elements constitutes a gradient-index (GRIN) lens. A lens support supports the lens elements in fixed spatial relation with respect to one another. Preferably, the lens support is arranged substantially in an hemispherical configuration having a predetermined radius and each of the lens elements is arranged normal to the radius.

The electromagnetic conduit for each lens element is preferably in the form of an optical fiber that couples a respectively associated lens output to the to the detector input. Thus, at least a portion of the electromagnetic signal that impinges upon the arrangement for collecting electromagnetic radiation is propagated to the detector input. The coupling, in a specific illustrative embodiment of the invention is effected by a bonding arrangement for affixing the plurality of optical fibers to the respectively associated lens outputs.

In accordance with a further aspect of the invention, an arrangement is provided for collecting infrared electromagnetic radiation. In this further aspect, there is provided a substrate for establishing a predetermined configuration for the arrangement. A plurality of gradient-indexed lens elements, each having a lens input for receiving an infrared electromagnetic radiation and a lens output for producing an output infrared electromagnetic signal responsive to the infrared electromagnetic radiation, are installed on the substrate in a predetermined array distribution. Additionally, a detector having a detector input is provided for receiving the output infrared electromagnetic signal. The detector is further provided with a detector output for producing an electrical signal responsive to the output infrared electromagnetic signal. As previously noted, an electromagnetic conduit couples the lens output of each of the gradient-indexed lens elements to the detector input.

In a specific embodiment of this further aspect of the invention, the substrate is arranged to establish a substantially hemispherical configuration for the arrangement. Such an arrangement achieves a high efficiency in delivering the electromagnetic energy that impinges upon the gradient-indexed lens elements to the detector.

Optical gain for the arrangement is substantially defined by the relationship:

$$G(\psi) = \frac{A_{\mathit{eff}}(\psi)}{A\cos(\psi)}$$

where, A is the area of the detector; and $A_{\mathit{eff}}(\psi)$ is the effective area of the receiving portion of the arrangement as a function of the angle of incidence, $\psi$, of the infrared electromagnetic radiation.

In accordance with a still further aspect of the invention, a further arrangement is provided for collecting electromagnetic radiation. The arrangement constitutes a substrate for establishing a predetermined configuration for the arrangement. A plurality of gradient-indexed lens elements, each having a lens input for receiving a portion of the electromagnetic radiation to be collected, and a lens output for producing an output electromagnetic signal responsive to the received portion of the electromagnetic radiation, is installed on the substrate in a predetermined array distribution. An electromagnetic conduit having a conduit input for coupling to the lens output of an associated one of the gradient-indexed lens elements and receiving a portion of the output electromagnetic signal of each of the gradient-indexed lens elements, and a conduit output for producing a collector output electromagnetic signal responsive to the electromagnetic radiation collected by the plurality of gradient-indexed lens elements is provided for each such gradient-indexed lens element.

In one embodiment, the electromagnetic conduit is formed of an optical fiber. Each such optical fiber, one for each gradient-indexed lens element, is coupled at an input end thereof to the respective lens output, and at an output end produces a portion of the collector output electromagnetic signal corresponding to the associated gradient-indexed lens elements. A bonding arrangement is employed for effecting the coupling between the optical fibers and the respectively associated lens outputs.

Further in accordance with the invention, there is provided a detector having a detector input for receiving the output infrared electromagnetic signal, and a detector output for producing an electrical signal responsive to the output electromagnetic signal. The detector output also contains the data or information that was encoded in the electromagnetic radiation. A coupling arrangement couples the output ends of the optical fibers to the detector input. The optical gain is defined substantially by the relationship:

$$G(\psi) = \frac{A_{eff}(\psi)}{A\cos(\psi)}$$

where, A is the area of the detector; and

Aeff($\psi$) is the effective area of the receiving portion of the arrangement as a function of the angle of incidence, $\psi$, of the infrared electromagnetic radiation.

In accordance with a further aspect of the invention, there is provided a wireless data node arrangement for data encoded in electromagnetic radiation. In accordance with the invention, there is provided a plurality of lens elements, each having a lens input for receiving a portion of the electromagnetic radiation and a lens output for producing an electromagnetic signal responsive to the received portion of the electromagnetic radiation and the data encoded therein. A detector has a detector input for receiving an input electromagnetic signal and the data encoded therein, and a detector output for producing an electrical signal responsive to the data encoded in the input electromagnetic signal. Additionally, an electromagnetic conduit is provided for coupling the lens output of each of the lens elements to the detector input and propagating the electromagnetic signal and the data encoded therein.

In a specific illustrative embodiment of the invention of this further aspect of the invention, there is provided a transmitter for issuing an output electromagnetic signal having further data encoded therein, the data and the further data corresponding respectively to data received and issued by the wireless node arrangement. A substrate establishes a predetermined configuration for the arrangement, the plurality of lens elements and the transmitter being arranged on the substrate. In a preferred embodiment, the substrate is arranged to establish a substantially hemispherical configuration for the wireless data node arrangement.

In a highly advantageous embodiment of the wireless data node arrangement, there is further provided a driver circuit for coupling the further data to the transmitter. Additionally, there is provided an amplifier for receiving the data from the detector.

BRIEF DESCRIPTION OF THE DRAWING

Comprehension of the invention is facilitated by reading the following detailed description, in conjunction with the annexed drawing, in which.

DETAILED DESCRIPTION

Figure 1:
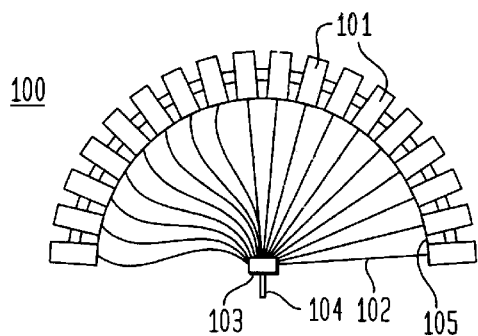
FIG. 1 is a schematic representation of a specific illustrative embodiment of the invention showing a radial arrangement of GRIN lenses connected to respective optic fibers.

FIG. 1 is a schematic representation of a specific illustrative embodiment of the invention showing a radial arrangement of GRIN lenses connected to respective optic fibers. As shown, an infrared collector 100 is provided with an infrared radiation detector 103, optical fibers 102, lens support structure 105, and gradient-indexed (GRIN) lenses 101. Electromagnetic signals (not shown), which may be in the form of infrared radiation, that are detected by the collector are provided via a connection 104 to a device (not shown) to which collector 100 is desired to provide the collected infrared radiation. GRIN lenses 101 are embedded in support structure 105, which in this specific illustrative embodiment of the invention has a substantially hemispherical configuration. The normal axis (not shown) of each GRIN lens end (not specifically identified in this figure) lies along the radial direction of the hemispherical support structure.

In the practice of the invention, the support structure can be formed of any structurally adequate material, such as plastic, metal, or wood. In a prototype embodiment, holes are drilled in the support shell to accommodate the GRIN lenses. In still further embodiments, GRIN lenses can be formed integrally with the support shell. Additionally, the GRIN lenses may have an optical coating (not show) applied thereon to reduce reflection. Such an optical coating will improve light collection, resulting in increased overall gain.

Each of optical fibers 102 has one end thereof glued to the center of the output end of each GRIN lens, the other end is glued vertically to the surface of detector 103. The optical coupling between the optical fibers, the GRIN lenses, and the detector must be a low loss communication, such that only a minimal amount of light is reflected from the coupling. Some commercially available GRIN lenses are supplied with a length of optical fiber coupled thereto. Conventional bonding arrangements are available and result in adequate coupling of the received electromagnetic energy to the optical fiber. In other embodiments, however, adequate optical coupling is achieved using a gap between the GRIN lens and the optical fiber.

In a preferred embodiment, the inner diameter of the hemisphere shell is D, the diameter of the GRIN lens is d, and the diameter of the optical fiber is $f_d$. The arrangement of the GRIN lenses may be configured differently from that of the specific illustrative embodiment of the invention disclosed herein, but preferably should be such that as nearly as possible the maximum number of GRIN lenses are provided on the concentrator. The shape of the support structure also may be varied by persons skilled in the art, in light of the teaching herein. Additionally, there are other arrangements and configurations of optical fibers on the detector surface that can be generated by persons skilled in the art. Preferably, a minimum of detector area should be employed to detect the optical output from the optical fibers, thereby maximizing the optical power density on the detector.

Commercially available GRIN lenses are adequate in the practice of the present invention and generally are available with a spectral range beginning with infrared light and extending through the range of visible light. Such commercially available GRIN lenses should be configured to have low loss and to be low in cost. Additionally, such GRIN lenses should be durable and preferably have a large aperture angle, or "numerical aperture," thereby maximizing the associated filed of view. The numerical aperture corresponds to the largest angle over which light is received by the lens.

Optical fiber formed of plastic is preferred in the practice of the invention, as no sheath therefor is required. However, optical fiber made of glass can be used in the practice of the invention, and has a cost that is comparable to that of plastic lenses. The optical fiber preferably should be durable and low in cost, and have a low loss characteristic.

With respect to the detector, such as detector 103 described hereinabove, it is desirable that same be available at low cost. Adequate performance is achieved in the practice of the invention using commercially available detectors having conventional gain characteristics, such as those that are available commercially from Siemens, identified as Siemens Model Nos. SFH 205 and SFH 217.

Figure 2:
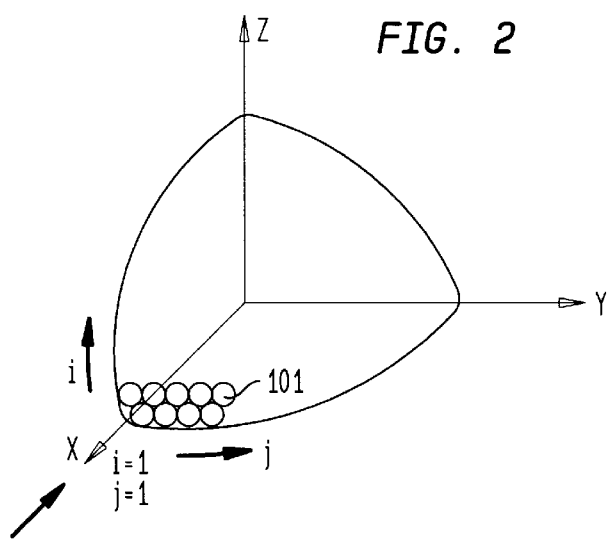
FIG. 2 is a schematic representation of a specific illustrative embodiment of the invention showing an hemispherical substrate upon which are mounted the GRIN lenses.
Figure 3:
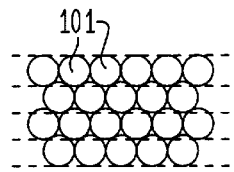
FIG. 3 is schematic representation of the spatial relationship of the GRIN lenses, with respect to one another.

FIG. 2 is a schematic representation of a specific illustrative embodiment of the invention showing an hemispherical substrate upon which are mounted the GRIN lenses. As shown in this figure, a quarter of the hemispherical shell structure has installed thereon a particular scheme of GRIN lenses that are arranged, for example, as shown in FIG. 3. In a preferred embodiment, the GRIN lenses can be arranged in two directions, i and j, as shown in FIG. 2. Thus, the total number of the GRIN lenses installed on the hemispherical support structure is:

$$S = \sum_{i=1}^{N} \sum_{j=1}^{M_i} \quad (1)$$

where N and $M_i$ are the integer portions of:

$$\frac{\pi d}{4d} + 1$$

and $$\frac{\pi D \cos\left[(i-1)\frac{2d}{D}\right]}{d}$$

and
respectively. The arrangement of optical fibers on the detector surface is shown in FIG. 3. In this embodiment, the required area of the detector, A, is:

$$A = S * fd^2 \times \frac{\sqrt{3}}{2} \quad (2)$$

Figure 4:
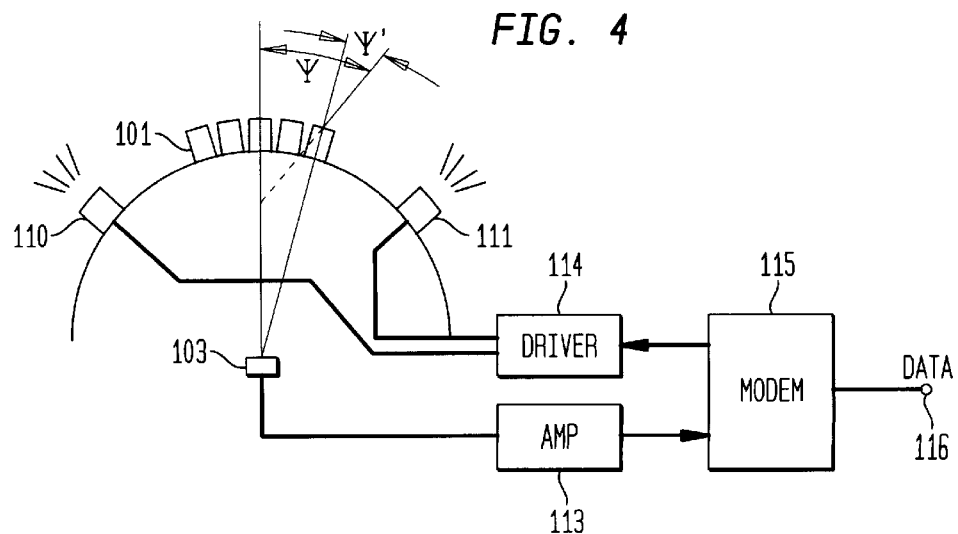
FIG. 4 is a schematic representation that is useful to illustrate the effect on transmission attenuation as a result of an angle of irradiance, $\psi$.

Assuming for the moment that a wide collimated beam having a uniform irradiance P (in units of W/cm$^2$) is incident at the collector, the beam, as shown in FIG. 4, forms an angle ψ with respect to the detector normal (radial in this embodiment). A single ray from the beam making an angle ψ' with the GRIN lens normal will be attenuated by a transmission factor T(ψ') which accounts for reflection loss.

When the concentrator is absent, the power intercepted by the detector is pAcos(ψ). With the concentrator in place, the detected power increases to $pA_{eff}(\psi)$, where $A_{eff}(\psi)$ is defined by the relationship:

$$A_{eff}(\psi) = \sum_{i=1}^{N} \sum_{j=1}^{M_i} T(\psi')\cos\psi'\pi\left(\frac{d}{2}\right)^2 C_0 \quad (3)$$

where, $$\cos\psi' = \sin\psi\sin\frac{2(j-1)d}{D\cos\left[(i-1)2\frac{d}{D}\right]}\cos\left[(i-1)2\frac{d}{D}\right] + \cos\psi\sin\left[(i-1)2\frac{d}{D}\right] \quad (4)$$

$$T(\psi') = 2n_1\frac{\cos\psi_i}{\cos\psi'}\left[\left(\frac{\sin\psi_i\cos\psi'}{\sin(\psi'+\psi_i)}\right)^2 + \left(\frac{\sin\psi_i\cos\psi'}{\sin(\psi'+\psi_i)\cos(\psi'-\psi_i)}\right)^2\right] \quad (5)$$

$$\sin\psi_i = \frac{\sin\psi'}{n_1} \quad (6)$$

$C_0=1$ when sin ψ'<NA;
$C_0=0$ when sin ψ'≧NA;
NA is the numerical aperture of the GRIN lens; and
$n_1$ is the average refractive index of the GRIN lens.
The optical gain G(ψ) provided by the concentrator is the ratio, of the detected powers:

$$G(\psi) = \frac{A_{eff}(\psi)}{A\cos(\psi)} \quad (7)$$

FIG. 4 also shows a plurality of infrared transmitters 110 and 111, which in this embodiment are useful to transmit information as would be required when the arrangement is employed as a received/transmitter for a network node (not shown in this figure). In a specific illustrative embodiment of the invention, infrared radiation detector 103 is coupled electrically at an output thereof to an amplifier 113. Infrared transmitters 110 and 111 are coupled electrically to a driver circuit 114. The driver circuit and amplifier 113 are each coupled to a modem 115 that, in this embodiment, receives data in serial forms at a data input 116 thereof The modem synchronizes receive and transmit states of the arrangement with other similar arrangements in an infrared data network (not shown in this figure). In other embodiments, a duplexing arrangement (not shown) is provided for effecting simultaneous bidirectional transmission of information. Additional isolation between the channels is achieved by operating the send and receive channels using different frequencies (colors) of the electromagnetic radiation and/or respectively associated filters (not shown).

Figure 5:
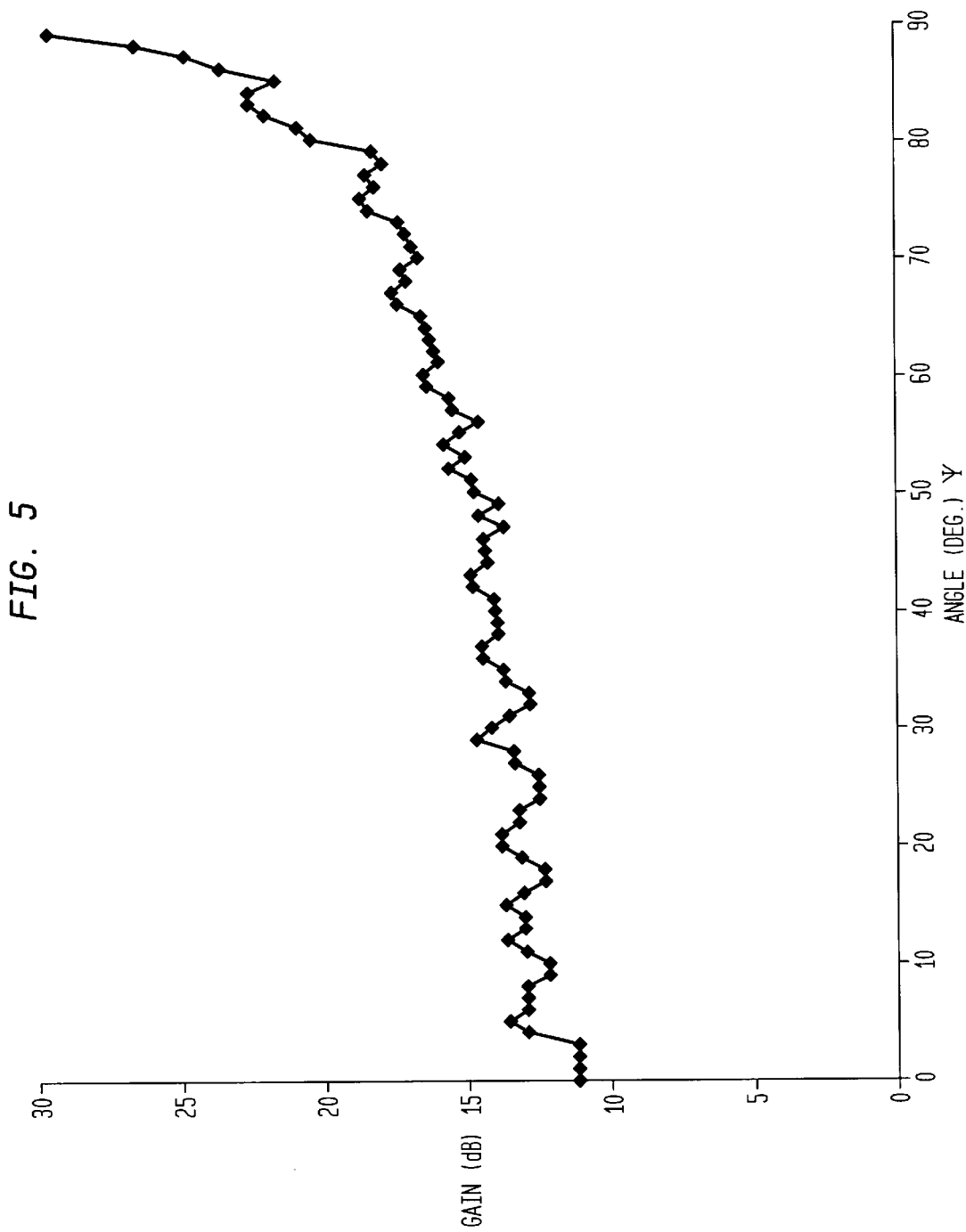
FIG. 5 is a graphical representation that is useful to illustrate the effect of the angle of incidence on gain, for a specific illustrative embodiment of the invention.

FIG. 5 is a graphical representation that shows the effect of the angle of incidence on gain for a preferred embodiment where D=40 mm; d=3 mm; and $f_d$=50 μm. The optical gain is much higher than that of the conventional concentrator. Since the GRIN lenses are discrete, the variations in the gain are discrete for different angles of incidence.

Although a hemispherical arrangement is disclosed in the preferred embodiment, such is not intended to be limiting of the scope of the invention. Persons of skill in the art can configure arrays of suitable GRIN lenses in accordance with the invention disclosed herein, employing other than hemispherical configurations, while achieving adequate efficiency for the particular application.

It is also to be understood that the present invention is not limited to a specific form or frequency of electromagnetic radiation. In this regard, it is to noted that persons of skill in the art can configure, or select from, commercially available GRIN lenses to achieve a desired spectral response. For example, GRIN lenses can be configured to be effective in various optical frequencies, illustratively from infrared, through the visible range, to ultraviolet. For these various optical frequencies, the length of the appropriate GRIN lenses will differ, but not necessarily the diameter thereof. Additionally, the materials from which the GRIN lenses are formed, and the colors of the materials, can be varied to customize the spectral response and the sensitivity, as well as to improve channel isolation (i.e. reduce cross-talk) in a serial or duplexed data node embodiment.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An arrangement for collecting electromagnetic radiation, the arrangement comprising:
    a plurality of lens elements, each having a lens input for receiving a portion of the electromagnetic radiation and a lens output for producing an electromagnetic signal responsive to the received portion of the electromagnetic radiation;
    a detector having a detector input for receiving an input electromagnetic signal, and a detector output for producing an electrical signal responsive to the input electromagnetic signal;
    an electromagnetic conduit for coupling the lens output of each of said lens elements to the detector input; and
    a lens support for supporting said lens elements in fixed spatial relation with respect to one another in an hemispherical configuration.

2. The arrangement of claim 1, wherein said plurality of lens elements each comprises a gradient-index lens.

3. The arrangement of claim 2, wherein the hemispherical configuration of said lens support has a predetermined radius and each of said lens elements is arranged normal to the radius.

4. The arrangement of claim 2, wherein said electromagnetic conduit comprises a plurality of optical fibers each for coupling a respectively associated one of the lens outputs to the detector input, whereby at least a portion of the electromagnetic signal is propagated to the detector input.

5. The arrangement of claim 4, wherein there is further provided a bonding arrangement for affixing the plurality of optical fibers to the respectively associated lens outputs.

6. An arrangement for collecting infrared electromagnetic radiation, the arrangement comprising:
    a substrate for establishing a predetermined hemispherical configuration for the arrangement;
    a plurality of gradient-indexed lens elements, each having a lens input for receiving an infrared electromagnetic radiation and a lens output for producing an output infrared electromagnetic signal responsive to the infrared electromagnetic radiation, and installed on said substrate means in a predetermined array distribution;
    a detector having a detector input for receiving the output infrared electromagnetic signal, and a detector output for producing an electrical signal responsive to the output infrared electromagnetic signal; and
    an electromagnetic conduit for coupling the lens output of each of said gradient-indexed lens elements to the detector input.

7. The arrangement of claim 6, wherein the arrangement is characterized by an optical gain substantially defined by the relationship:

$$G(\psi) = \frac{A_{eff}(\psi)}{A\cos(\psi)}$$

where,
    A is the area of said detector; and
    $A_{eff}(\psi)$ is the effective area of the receiving portion of the arrangement as a function of the angle of incidence, $\psi$, of the infrared electromagnetic radiation.

8. An arrangement for collecting an electromagnetic radiation, the arrangement comprising:
    a substrate for establishing a predetermined hemispherical configuration for the arrangement;
    a plurality of gradient-indexed lens elements, each having a lens input for receiving a portion of the electromagnetic radiation to be collected and a lens output for producing an output electromagnetic signal responsive to the received portion of the electromagnetic radiation, and installed on said substrate in a predetermined array distribution; and
    an electromagnetic conduit having a conduit input for coupling to the lens output of each of said gradient-indexed lens elements and receiving a portion of the output electromagnetic signal of each of said gradient-indexed lens elements, and a conduit output for producing a collector output electromagnetic signal responsive to the electromagnetic radiation collected by said plurality of gradient-indexed lens elements.

9. The arrangement of claim 8, wherein said electromagnetic conduit comprises a plurality of optical fibers, each coupled at an input end thereof to a respective lens output of said plurality of gradient-indexed lens elements, and having an output end for producing a portion of the collector output electromagnetic signal corresponding to the associated gradient-indexed lens elements.

10. The arrangement of claim 9, wherein there is further provided bonding arrangement for effecting the coupling between the optical fibers and the respectively associated lens outputs.

11. The arrangement of claim 9, wherein there is further provided a detector having a detector input for receiving the output infrared electromagnetic signal, and a detector output for producing an electrical signal responsive to the output electromagnetic signal.

12. The arrangement of claim 11, wherein there is further provided a coupling arrangement for coupling the output ends of said optical fibers to the detector input.

13. The arrangement of claim 12, wherein the arrangement is characterized by an optical gain substantially defined by the relationship:

$$G(\psi) = \frac{A_{eff}(\psi)}{A\cos(\psi)}$$

where,
    A is the area of said detector; and
    $A_{eff}(\psi)$ is the effective area of the receiving portion of the arrangement as a function of the angle of incidence, $\psi$, of the infrared electromagnetic radiation.

14. A wireless data node arrangement for data encoded in electromagnetic radiation, the arrangement comprising:
    a plurality of lens elements arranged in a predetermined hemispherical configuration, each having a lens input for receiving a portion of the electromagnetic radiation and a lens output for producing an electromagnetic signal responsive to the received portion of the electromagnetic radiation and the data encoded therein;

a detector having a detector input for receiving an input electromagnetic signal and the data encoded therein, and a detector output for producing an electrical signal responsive to the data encoded in the input electromagnetic signal; and an electromagnetic conduit for coupling the lens output of each of said lens elements to the detector input and propagating the electromagnetic signal and the data encoded therein.

15. The wireless data node arrangement of claim 14 wherein there is further provided a transmitter for issuing an output electromagnetic signal having further data encoded therein, the data and the further data corresponding respectively to data received and issued by the wireless node arrangement.

16. The wireless data node arrangement of claim 15, wherein there is further provided a substrate for supporting said plurality of lens elements in the hemispherical configuration, said transmitter being arranged on said substrate.

17. The wireless data node arrangement of claim 15, wherein said substrate is configured in the substantially hemispherical configuration.

18. The wireless data node arrangement of claim 15, wherein there is further provided:

a driver for coupling the further data to said transmitter; and an amplifier for receiving the data from said detector.

* * * * *